(12) United States Patent
Smith et al.

(10) Patent No.: US 11,893,527 B2
(45) Date of Patent: Feb. 6, 2024

(54) SYSTEM AND METHOD FOR RETURNING LOST ITEMS

(71) Applicant: Toyota Motor North America, Inc., Plano, TX (US)

(72) Inventors: Lucas D. Smith, Frisco, TX (US); Jay N. Bartholomew, McKinney, TX (US)

(73) Assignee: Toyota Motor North America, Inc., Plano, TX (US)

( * ) Notice: Subject to any disclaimer, the term of this patent is extended or adjusted under 35 U.S.C. 154(b) by 112 days.

(21) Appl. No.: 16/580,484

(22) Filed: Sep. 24, 2019

(65) Prior Publication Data

US 2021/0090004 A1 Mar. 25, 2021

(51) Int. Cl.
*G06Q 10/08* (2023.01)
*G06Q 10/083* (2023.01)
*G01C 21/34* (2006.01)

(52) U.S. Cl.
CPC ....... *G06Q 10/083* (2013.01); *G01C 21/3407* (2013.01)

(58) Field of Classification Search
CPC .......................... G01C 21/3407; G06Q 10/083
See application file for complete search history.

(56) References Cited

U.S. PATENT DOCUMENTS

| 10,223,844 B1 | 3/2019 | Schwie et al. | |
| 10,303,961 B1 * | 5/2019 | Stoffel | B60Q 3/76 |
| 10,657,486 B1 * | 5/2020 | Wolter | G06Q 10/0833 |
| 2012/0173448 A1 * | 7/2012 | Rademaker | G06Q 50/28 |
| | | | 705/338 |
| 2016/0071056 A1 * | 3/2016 | Ellison | G06Q 10/08355 |
| | | | 705/338 |
| 2018/0136655 A1 | 5/2018 | Kim et al. | |
| 2018/0227393 A1 * | 8/2018 | Daub | H04L 67/22 |
| 2018/0292829 A1 | 10/2018 | Li | |
| 2018/0297612 A1 | 10/2018 | Fakamachi | |

(Continued)

OTHER PUBLICATIONS

M. Li, L. Zhu and X. Lin, "Efficient and Privacy-Preserving Carpooling Using Blockchain-Assisted Vehicular Fog Computing," in IEEE Internet of Things Journal, vol. 6, No. 3, pp. 4573-4584, Jun. 2019, doi: 10.1109/JIOT.2018.2868076. (Year: 2019).*

*Primary Examiner* — Daniel Vetter
*Assistant Examiner* — Christopher Gomez
(74) *Attorney, Agent, or Firm* — Christopher G. Darrow; Darrow Mustafa PC

(57) ABSTRACT

The disclosed subject matter relates to a delivery system for returning a property item left in a transportation environment to a passenger of the transportation environment. A method can include determining a first waypoint based on a location of the property item, determining a second waypoint based on a pickup location identified by the passenger, constructing a delivery route between the first waypoint and the second waypoint in which the delivery route has at least one segment that corresponds with at least a portion of at least one selected trip from a plurality of trips to be carried out in the transportation environment, obtaining confirmation of acceptance of the delivery route from at least one participant of the at least one selected trip, and obtaining confirmation of delivery of the property item by the at least one participant and/or the passenger in accordance with the delivery route.

11 Claims, 4 Drawing Sheets

(56) References Cited

U.S. PATENT DOCUMENTS

| | | |
|---|---|---|
| 2018/0299895 A1 | 10/2018 | Knotts et al. |
| 2018/0308191 A1 | 10/2018 | Matthiesen et al. |
| 2018/0315146 A1 | 11/2018 | Matthiesen et al. |
| 2018/0321688 A1 | 11/2018 | Chase et al. |
| 2018/0374002 A1 | 12/2018 | Li |
| 2020/0051021 A1* | 2/2020 | Ohtani ............. G06Q 10/08355 |

* cited by examiner

| Pass. ID | Driver ID | Pickup Time | Pickup Loc. | Drop Loc. | Cost |
|---|---|---|---|---|---|
| 444-123-4565 | 555-123-1234 | 2/2/2019 3:45 | 38,-77 | 30,-79 | $7.00 |
| 333-321-6789 | 777-345-3456 | 2/2/2019 3:51 | 23,-89 | 24,-90 | $12.00 |
| 222-567-7657 | 555-345-3456 | 2/2/2019 4:02 | 48,-68 | 52,-71 | $5.50 |
| 111-789-9876 | 222-567-5678 | 2/2/2019 4:12 | 78,88 | 79,92 | $6.00 |

300

SYSTEM AND METHOD FOR RETURNING LOST ITEMS

TECHNICAL FIELD

The subject matter described herein relates, in general, to a system and method for a transportation system to return lost items, and, more particularly, to a delivery system that leverages current passenger travel routes to execute delivery of the lost items.

BACKGROUND

As utilization of various types of driver/passenger transportation systems (e.g., ridesharing and taxi services) continue to proliferate, a likelihood of passengers accidently leaving personal items in a vehicle increases. The difficulty of retrieving lost items is exacerbated for participants in such systems that eschew the use of personal vehicles and rely entirely on the driver/passenger system for transportation. For example, after a day of catching several rides a passenger may suddenly realize that s/he left behind a valued item during one of the rides, however, unsure of which ride. The passenger is left with the daunting and time-consuming task of trying to track down which vehicle the item might have been left in, figuring out where the vehicle might be located, and only after these tasks are complete, attempt to coordinate a meeting place and time to retrieve the lost item.

During a busy day the passenger may not have the time to manually handle the research, reaching out and tedious following up to retrieve the item in a timely manner. However, the longer the passenger puts off tracking down the lost item, the more difficult the retrieval task becomes.

SUMMARY

The disclosed systems and methods relate to a system and method for automatically detecting items lost in a driver/passenger transportation system and utilizing aspects of the transportation system itself to return the lost item to its owner.

In one embodiment, a delivery system for returning a property item left in a transportation environment to a passenger of the transportation environment includes a route database storing records of trips to be carried out in the passenger transportation environment, a server, comprising one or more processors, and a memory communicably coupled to the one or more processors and storing a waypoint module including instructions that when executed by the one or more processors cause the one or more processors to determine a first waypoint based on a location of the property item and a second waypoint based on a pickup location for the passenger, a routing module including instructions that when executed by the one or more processors cause the one or more processors to construct a delivery route between the first waypoint and the second waypoint, wherein the delivery route is constructed having at least one segment that corresponds with at least a portion of at least one selected trip from the trips to be carried out in the passenger transportation environment, and a route confirmation module including instructions that when executed by the one or more processors cause the one or more processors to obtain confirmation of acceptance of the delivery route from at least one participant of the at least one selected trip.

In another embodiment, a method of delivering a property item left in a transportation environment to a passenger of the transportation environment includes determining a first waypoint based on a location of the property item, determining a second waypoint based on a pickup location identified by the passenger, constructing a delivery route between the first waypoint and the second waypoint, the delivery route having at least one segment that corresponds with at least a portion of at least one selected trip from a plurality of trips to be carried out in the transportation environment, obtaining confirmation of acceptance of the delivery route from at least one participant of the at least one selected trip, and obtaining confirmation of delivery of the property item by the at least one participant and/or the passenger in accordance with the delivery route.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
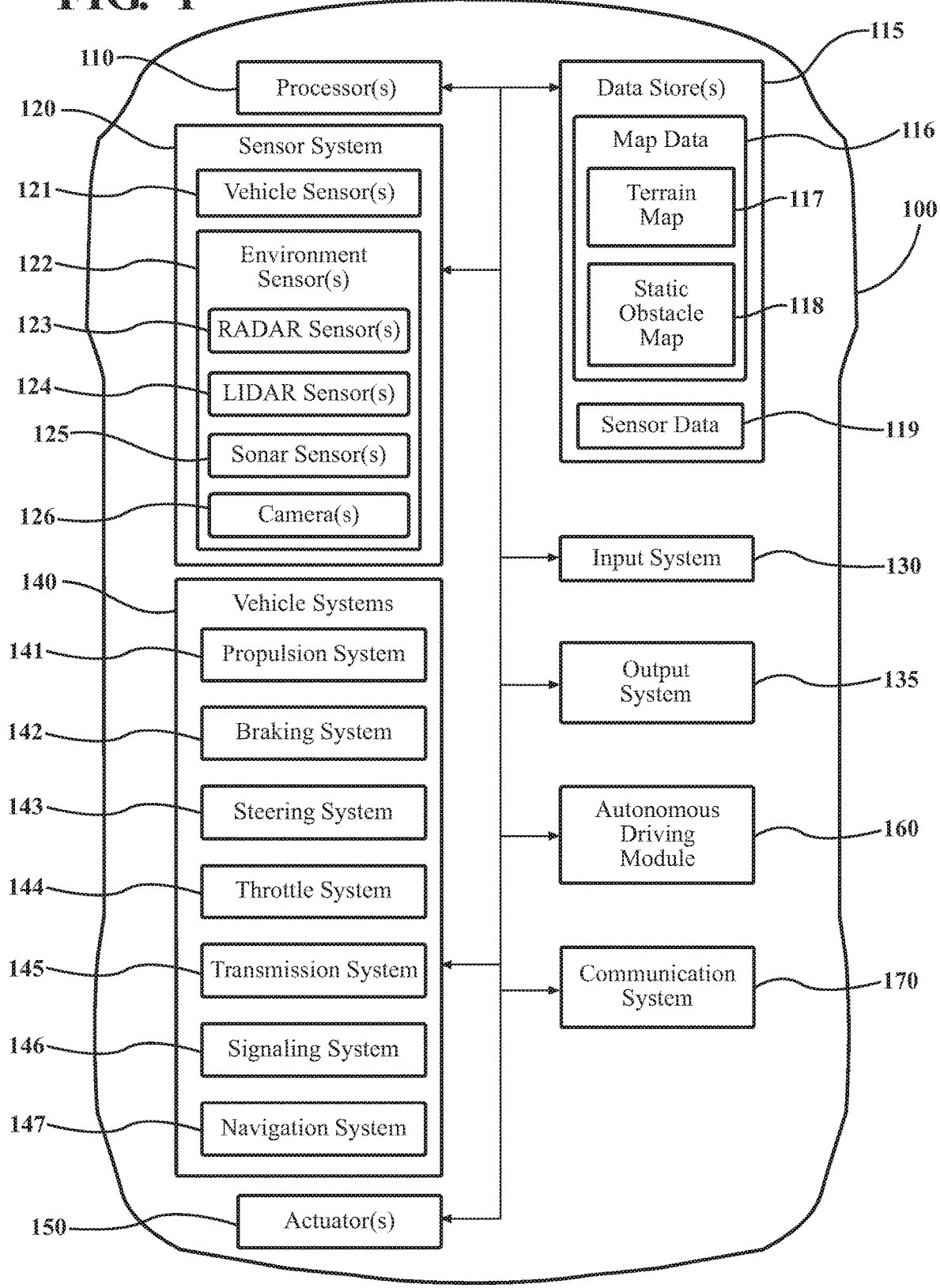
FIG. 1 illustrates one embodiment of a vehicle within which systems and methods disclosed herein may be implemented.

Systems, methods, and other embodiments associated with an automated delivery system for returning a lost item to its owner are disclosed. As previously mentioned, in conventional passenger transportation environments the burden of tracking down and retrieving a lost property item lies primarily on the owner. The disclosed delivery system can relieve this burden and automatically detect a lost property item and create and implement a return plan to return the item to its owner by using existing resources of the transportation environment itself, such as routes and scheduled trips of other participants traveling in the transportation environment.

As noted above, the disclosed delivery system can operate within a transportation environment. A "transportation environment" as used herein refers to the entirety of a travel ecosystem, such as the drivers, the vehicles, and the passengers that all participate in a given rideshare program, taxi company, bus company, public transit, or the like. The exact contours of the transportation environment in which the disclosed delivery system is instituted can be defined during implementation. For example, in one implementation the transportation environment may comprise a single entity transportation system, e.g., a single rideshare company program. In this case, the drivers, vehicles and passengers of the rideshare company comprise the transportation environment. In another implementation the transportation environment can span multiple entities, such as, for example, multiple rideshare company programs and taxi companies operating within a given municipality or locality. It should be understood that these implementations are merely examples and the disclosed delivery system can be used in other implementations of transportation environments not listed here.

In any case, various entities, components or participants can detect a lost property item in a transportation environment in any of several ways. Without limitation, in one approach, vehicles that participate in the transportation environment can include a detection system that uses one or more sensors to detect when an object has been left in a vehicle cabin. For example, one or more cameras in the cabin of a vehicle can use image recognition to recognize an image of an empty cabin and compare the empty cabin image to an image captured upon the exit of a passenger. If results of the comparison indicate that an item remains in the cabin, the detection system can take responsive action, such as communicate a notification to the detection system to initiate a tracking log and a notification to the driver to prompt the driver to investigate. For example, in a rideshare program, the detection system can send a message to the driver through the rideshare program system itself, send a text message to the driver, or use some other form of communication.

If, upon investigation, the driver determines that a property item has in fact been left in the vehicle, the driver can respond to the notification, for example, to affirmatively indicate confirmation that a lost property item has been identified in the vehicle.

In another approach a driver or other passenger can notice a property item and report it to the delivery system, for example, through a user interface such as a website or an app. In any case, after a lost property item has been identified the disclosed detection system can assign a tracking identifier to the item and transmit notifications to the most recent passengers of the vehicle in which the item was found. In one or more embodiments, the notification can prompt the passengers to check their belongings to determine whether they have lost anything, and if they find an item is missing, to identify the missing item in a response to the notification. By requiring the passenger to identify the property item the delivery system may take a measure against false claims.

After the appropriate passenger or owner has been identified, the disclosed delivery system initiates the return process. In one or more embodiments, as will be discussed further below, the disclosed delivery system determines a first waypoint (location of the property item) and a second waypoint (pickup location designated by the owner) and constructs a delivery route to transport the property item from the first waypoint to the second waypoint. The disclosed delivery system utilizes resources that are available in the transportation environment, such as established communication mechanisms, scheduled trips, routes, and other passengers and/or drivers to execute the delivery. In one or more embodiments, the mechanism(s) for delivery may be determined based at least in part on a calculated distance between the first waypoint and the second waypoint.

Referring to FIG. 1, an example of a vehicle 100 that can function in a transportation environment and be used to implement features of the disclosed delivery system is illustrated. As used herein, a "vehicle" is any form of powered transport. In one or more implementations, the vehicle 100 is an automobile. While various implementations of the disclosed delivery system will be described herein with respect to automobiles, it should be understood that embodiments are not limited to automobiles. In some implementations the vehicle 100 may be a bus, a robotic device, or some other form of powered transport that, for example, is equipped for communicating with vehicles or other systems and includes sensors to perceive aspects of the interior and surrounding environment.

As shown in FIG. 1, the vehicle 100 includes multiple elements. It should be understood that various embodiments may not require the vehicle 100 to have all of the elements shown in FIG. 1. The vehicle 100 can have any combination of the various elements shown in FIG. 1. Further, the vehicle 100 can have additional elements other than those shown in FIG. 1. In some arrangements, the vehicle 100 may be implemented without one or more of the elements shown in FIG. 1. While the various elements are shown as being located within the vehicle 100 in FIG. 1, it should be understood that one or more of these elements can be located external to the vehicle 100, e.g., provided by a cloud-based service. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 2-4 for purposes of brevity in this description. It will be appreciated that for simplicity and clarity of illustration, where appropriate, reference numerals have been repeated among the different figures to indicate corresponding or analogous elements. In addition, while the discussion outlines numerous specific details to provide a thorough understanding of the embodiments described herein, those of skill in the art, will understand that the embodiments described herein may be practiced using various combinations of these elements.

In any case, the vehicle 100 includes a communication system 170 that is configured to correspond with a delivery system as disclosed herein and perform methods and other functions discussed below relating to detecting and facilitating a return delivery of a lost item. The noted functions, implementations, and methods will become more apparent in the following discussion of the figures.

Figure 2:
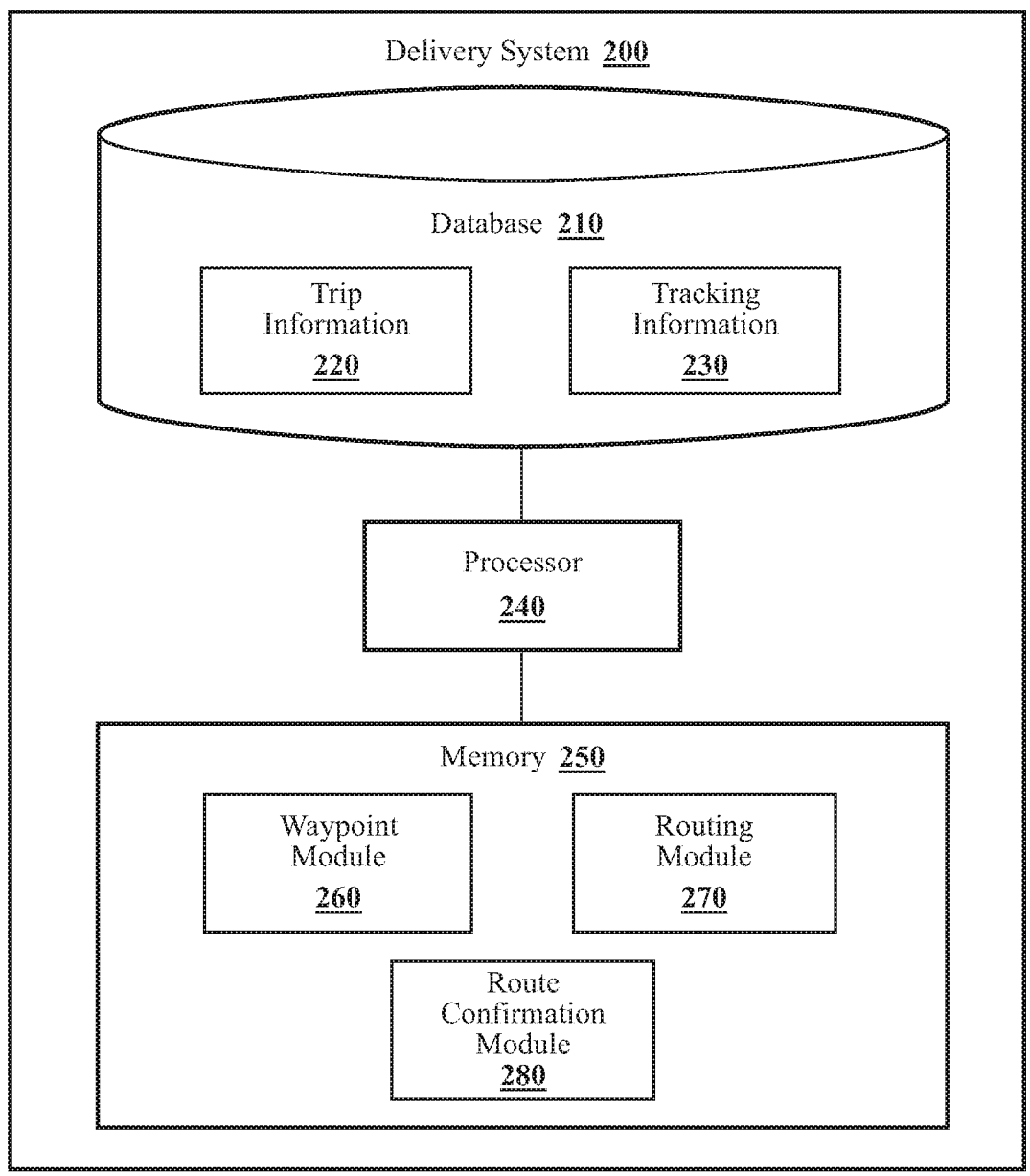
FIG. 2 illustrates one embodiment of a delivery system according to the disclosed embodiments.

FIG. 2 shows one embodiment of a delivery system 200. In one or more implementations the delivery system 200 can be implemented in a cloud-based computing system, a server connected to a network, or another capable computing system. The delivery system 200, in one embodiment, includes a database 210 that stores various types of data, a processor 240, and a memory 250 that stores a waypoint module 260, a routing module 270, and a route confirmation module 280. The memory 250 is a random-access memory (RAM), a read-only memory (ROM), a hard-disk drive, a flash memory, or another suitable memory for storing the modules 260, 270 and 280. The modules 260, 270 and 280 are, for example, constructed as computer-readable instructions that when executed by the processor 240 cause the processor 240 to perform the various functions disclosed herein.

As shown, the delivery system 200 includes a database 210 that stores trip information 220 and tracking information 230, both of which will be described further below. The database 210 is, in one embodiment, one or more electronic data structures which may be separate from the memory 250 or stored in the memory 250 or another data store, such as a cloud-based storage, a removable memory device, or another suitable location that is accessible to the modules 260, 270, and 280. The database 210 is constructed to operate in response to commands that can be executed by the processor 240 for analyzing stored data, retrieving stored data, organizing stored data, and so on. Thus, in one embodiment, the database 210 stores data described above (as well as other data) which may be used by the modules 260, 270, and 280 in executing various functions.

The trip information 220 may be stored in one or more data structures of the database 210. The trip information 220 indicates past, current and future trips that are/have been scheduled to take place in the transportation environment.

Figures 3, 4:
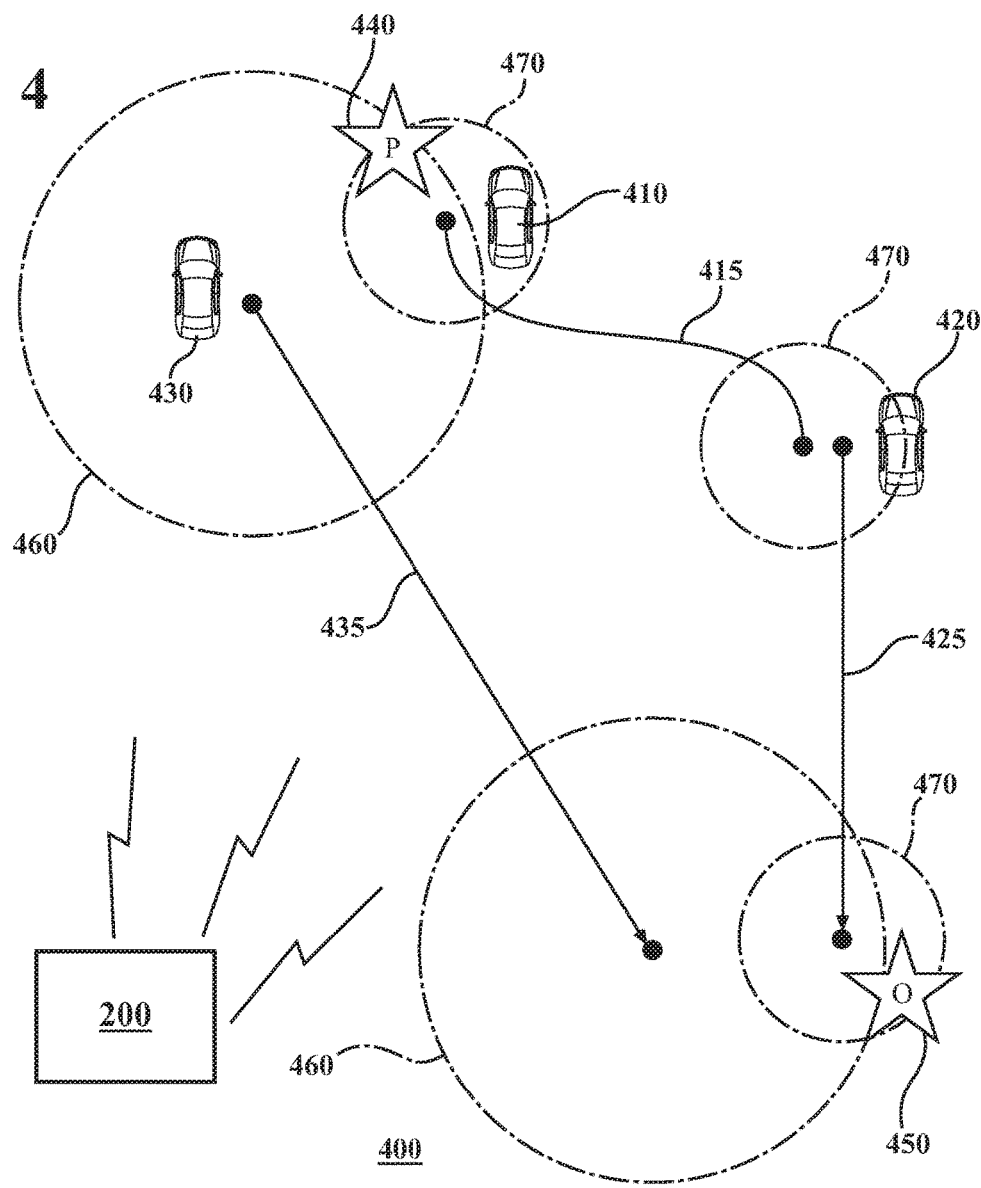
FIG. 3 illustrates one embodiment of a trip information data structure according to the disclosed embodiments.
FIG. 4 illustrates a delivery scenario according to the disclosed embodiments.

FIG. 3 shows an example trip information data structure 300. For example, the data structure 300 can be implemented as a table in a database. The data structure 300 can store various types of data associated with trips that are scheduled in the transportation environment. For example, for a given trip, in one embodiment the data can include a passenger identifier (ID) 310 (e.g., a phone number, a user name, an e-mail address, or another ID), a driver ID 20, a pickup time 330 for the trip, a pickup location 340 (e.g., global positioning system (GPS) coordinates, an address or another location identifier) where the driver will pickup the passenger, a drop-off location 350 where the driver will drop off the passenger, and a cost 360 of the trip. It should be understood that the data structure 300 shown in FIG. 3 is only one embodiment and greater or fewer data types may be included in the data structure 300 within the scope of the disclosed subject matter. For example, information regarding the vehicle model and color, information regarding passenger/driver ratings, actual transit times between locations, actual route taken between routes, or other types of information can be included.

The tracking information 230 may also be stored in one or more data structures of the database 210. As will be discussed further below, the tracking information 230 indicates information about a property item that is identified as lost within the transportation environment. The information can include a location, a handoff status, and other information.

The waypoint module 260 generally includes instructions that function to control the processor 240 to determine waypoints for delivering a property item back to its owner. For example, the waypoint module 260 can determine a first waypoint based on a location of the property item and a second waypoint based on a pickup location for an owner of the property item.

The routing module 270 generally includes instructions that function to control the processor 240 to determine a delivery route based on the way points. For example, the routing module 270 can construct a delivery route between the first waypoint and the second waypoint, with the delivery route having at least one segment that corresponds with at least one selected trip from the trips to be carried out in the passenger transportation environment, as indicated in the trip information 220. That is, the routing module 270 can use one or more participants (e.g., passengers or drivers) of scheduled trips to effect delivery of the property item.

The route confirmation module 280 generally includes instructions that function to control the processor 240 to obtain confirmation of acceptance of the delivery route from at least one participant of a trip selected by the routing module 270, and to obtain confirmation of delivery of the property item by the at least one participant in accordance with the delivery route.

FIG. 4 illustrates an example of an implementation of the disclosed delivery system 200 in a transportation environment 400. The transportation environment 400 is, in this example, a rideshare program that includes multiple vehicles, including vehicles 410, 420, 430, as well as other vehicles not shown. The disclosed delivery system 200 can communicate wirelessly with the vehicles 410, 420, 430, for example, via communication system 170 (FIG. 1), and/or with drivers of the vehicles 410, 420, 430, for example, via text messages, an interface such as an app, or other types of communication. An example execution of a delivery operation will now be described with reference to FIGS. 2 and 4.

The vehicles 410, 420, 430 are scheduled to travel on trips having routes 415, 425, 435. Information and details regarding routes 415, 425, 435 are stored as trip information 220 accessible to the delivery system 200, as described above regarding FIGS. 2 and 3. A vehicle 410 detects that a property item 440 has been left in the vehicle 410 and notifies the delivery system 200.

The delivery system 200 identifies the owner of property item 440, e.g., based on information from the vehicle 410 or from transmitting notifications to recent passengers of the vehicle 410 according to the trip information 220. When the owner has been identified, the waypoint module 260 transmits a request to the owner to identify a pickup location. The owner can designate a location 450, e.g., an address, at which the owner desires to have the property item 440 delivered. The waypoint module 260 determines a first waypoint based on the location of the property item 440 and a second waypoint based on the pickup location 450 identified by the owner.

The routing module 270 constructs a delivery route between the first waypoint and the second waypoint, based at least in part on one or more routes that are currently scheduled as indicated in the trip information 220. That is, the routing module 270 constructs the delivery route to include at least one segment that corresponds with at least one selected trip from the trips scheduled to be carried out in the transportation environment 400, as indicated in the trip information 220.

In one or more embodiments, the routing module 270 can determine a delivery price associated with the delivery route. The delivery price can be based on one or more factors, such as length of the delivery route, route options (e.g., expedited delivery), timing of return request, as well as current demand of the transportation system (e.g., surge pricing).

The routing module 270 can use a path finding algorithm to determine a possible route or attempt to find an optimal route. Beginning at the first waypoint, the routing module 270 may explore a path along the routes of scheduled trips that can, using a combination of routes if necessary, reach the second waypoint or a location as close to it as possible within certain constraints, such as available paths and timing for connecting routes. That is, while different paths may be possible across a plurality of routes, the timing of the trips must be considered within the constraints to construct a delivery path that ensures that a handoff of the property item 440 can occur between the trips. The routing module 270 can further attempt to optimize the delivery path to reduce the delivery price or minimize return time to owner.

For example, the routing module 270 can determine that a path constructed of routes 415 and 425 is one possible path for a delivery route to transport the property item 440 to the second waypoint. The feasibility of the potential delivery route depends upon the trip of route 415 ending at or near the location and time of the beginning of the trip of route 425. In one or more embodiments, a handoff can occur in the middle of a trip instead of at the beginning/end of the trip. In this case, the delivery route is constructed having at least one segment that corresponds with at least one portion of a selected trip.

The timing and location constraints can be mitigated in some cases by obtaining a commitment level from participants in the transportation environment 400 that allows for a degree of widening of time/location windows at the beginning or ending of a trip to allow for a successful handoff. For example, in one or more embodiments, participants (e.g., riders and drivers) can pre-register under an agreement to accept a window of time (e.g., two minutes, five minutes, etc.) at the beginning or ending of their trip to facilitate a handoff when the routing module 270 selects their trip as a segment of a delivery route. The pre-registration agreement can, for example, be a prerequisite for participants to receive automatic delivery of lost items and conversely require participants to agree to participate in a delivery that does not require them to deviate beyond a threshold amount from their original trip.

After the routing module 270 has constructed a delivery route, the route confirmation module 280 notifies the participants, whose trip routes form segments of the delivery route, of the task that they will execute as part of the delivery route. For example, referring to FIG. 4, the route confirmation module 280 can transmit a request for confirmation to the passengers of vehicles 410 and 420, notifying them of their selection for participation in a delivery route and providing instructions for carrying out the delivery. The instructions can include details such as identifying the make/model/color of the next vehicle in the handoff chain, identifying the name of the next participant who should accept the handoff, and identifying the owner/recipient. After receiving confirmation from the participants, the route confirmation module 280 stores the delivery route details in the tracking information 230.

The tracking information 230 identifies the trip segments and participants of a given delivery route, as well as the status of the delivery. For example, for the delivery route constructed of routes 415 and 425, the tracking information 230 includes information identifying the vehicle 410 of the first segment (route 415), identifying the passenger/driver of vehicle 410 who is responsible for transporting the property item 440 over the first segment, identifying the vehicle 420 of the second segment (route 425), and identifying the passenger/driver of vehicle 420 who is responsible for transporting the property item 440 over the second segment.

As the delivery is carried out, the route confirmation module 280 transmits a request for confirmation of handoff to the participants and updates the tracking information 230 accordingly. For example, at the start of the first segment (route 415) the route confirmation module 280 transmits a request for handoff confirmation to the driver/rider of vehicle 410. Upon the completion of the trip of route 415, the driver/rider of vehicle 410 completes the handoff to the driver/rider of vehicle 420, as per the instructions provided, and submits confirmation of the handoff to the route confirmation module 280. The route confirmation module 280 updates the status of the delivery in the tracking information 230 and transmits a request for confirmation to the driver/rider of vehicle 420 for the second segment (route 425). The route confirmation module 280 can further transmit an update communication to the owner upon completion of a handoff to keep the owner informed of the progression of the delivery. The route confirmation module 280 can obtain a final confirmation of delivery of the item from the responsible participant of a final segment of the delivery route.

In this manner the delivery of the property item 440 back to its owner is automatically carried out without requiring the owner to handle any of the difficulty associated with tracking down the lost item, contacting drivers, corresponding to set up a meeting place, etc.

In one or more embodiments, the waypoint module 260 can further provide the owner/recipient with an option to request expedited delivery. In an expedited delivery, the routing module 270 can use a path finding algorithm that attempts to find the shortest path between the first waypoint (item location) and the second waypoint (owner location) with fewer constraint thresholds. For example, the routing module 270 can consider the threshold amount of extra travel or extra amount of time at a start or end of a trip may be greater when constructing an expedited delivery route than when constructing a non-expedited delivery route.

Referring to FIG. 4, in one or more embodiments the routing module 270 can define varying levels of radial thresholds that define how far a participant is required to travel at a start or end of a trip as part of the delivery route. For example, the routing module 270 can consider an expedited radial threshold 460 for a route start/end point to be greater than a non-expedited radial threshold 470. Under the expedited radial threshold 460, the routing module 270 can determine that the route 435 is available and is a shorter and more direct path for constructing a delivery route.

In one or more embodiments, the routing module 270 can further construct an expedited delivery route based on selecting a single trip from the trip information. For example, the routing module 270 can attempt to maximize various parameters, such as selecting the trip that has the least total combined distance between the trip beginning location and the first waypoint, and the trip ending location and the second waypoint. This type of delivery route construction may require extensive additional travel on the part of the participant to complete.

In any case, participants in expedited deliveries can be provided with additional incentives, such as travel credits for use in the transportation environment 400, to compensate for the extra time/distance that may be added to their original trip. Generally, using an expedited delivery route construction may result in a faster delivery of the property item to the owner/recipient.

Figure 5:
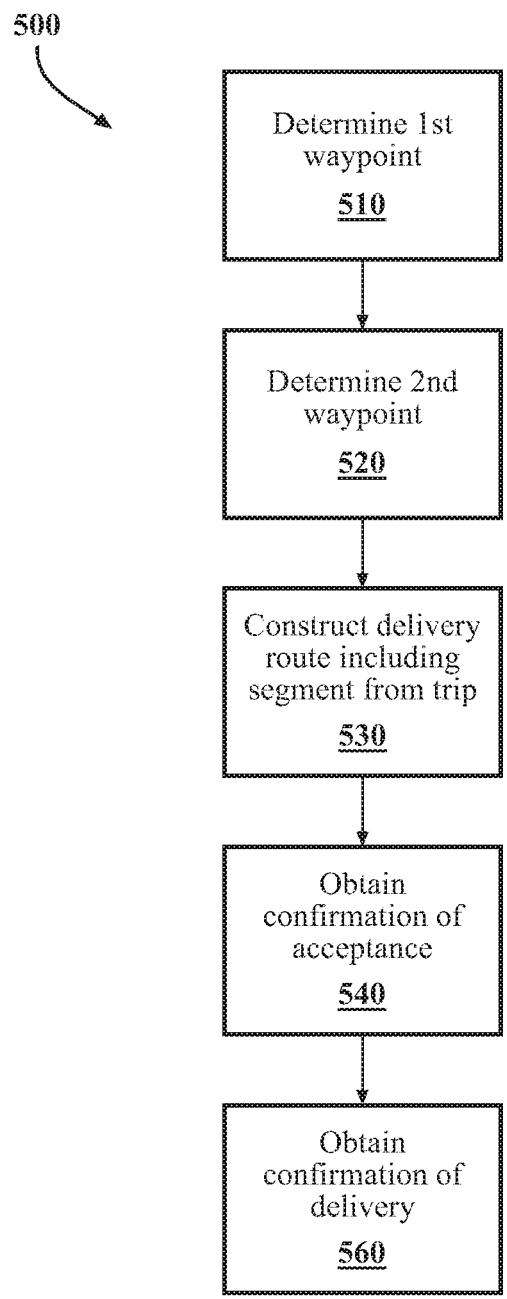
FIG. 5 illustrates a flowchart of a method of delivering a property item according to the disclosed embodiments.

FIG. 5 shows a flowchart 500 of a general embodiment of a method of returning a property item left in a transportation environment to a passenger of the transportation environment according to the disclosed subject matter. At operation 510 the delivery system 200 determines a first waypoint based on a location of the property item, e.g., as discussed above. At operation 520 the delivery system 200 determines a second waypoint based on a pickup location identified or confirmed by the passenger. At operation 530 the delivery system 200 constructs a delivery route between the first waypoint and the second waypoint, with the delivery route having at least one segment that corresponds with at least one selected trip from a plurality of trips to be carried out in the transportation environment. At operation 540 the delivery system 200 obtains confirmation of acceptance of the delivery route from at least one participant of the at least one selected trip. At operation 560 the delivery system 200 obtaining confirmation of delivery of the property item by the at least one participant and/or the passenger in accordance with the delivery route.

Thus, the disclosed delivery system provides an automatic way to return a lost property item to an owner by utilizing resources available in a transportation environment. The disclosed delivery system provides options as to the expediency of delivery, and also can keep the owner updated on the status of the delivery, providing peace of mind and assurance.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle that operates within the transportation environment. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can further include map data 116. The map data 116 can include maps of one or more geographic areas, e.g. used for navigating routes as discussed above. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles) and, in one or more embodiments, at least a portion of the internal environment of the vehicle 100 (e.g., for detecting property items that have been left behind by passengers), and store the data as sensor data 119 in the data store(s) 115.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more cameras, one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). Such inputs can include route confirmation or handoff confirmation, as discussed above. The vehicle 100 can include an output system 135. An "output system" includes any device, component, or arrangement or groups thereof that enable information/data to be presented to a vehicle passenger (e.g., a person, a vehicle passenger, etc.). Such output can include delivery route instructions, or other communications as described above.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110 and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, may be partially or fully autonomous.

The processor(s) 110 and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140.

The processor(s) 110 and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

Similar to the disclosed delivery system 200, the vehicle 100 can include one or more modules. The modules can be implemented as computer-readable program code that, when executed by a processor 240, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive sensor data 119 from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data. The autonomous driving module(s) 160 can be further configured to receive lane change detection notifications and/or path estimations as described above.

The autonomous driving module(s) 160 can be configured to determine travel path(s), determine current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from sensor data 119. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A property delivery system for returning a property item left in a transportation environment to a passenger of the transportation environment, comprising:
   a route database storing records of trips to be carried out in the transportation environment;
   a server, comprising one or more processors;
   a memory communicably coupled to the one or more processors and storing:
   a waypoint module including instructions that when executed by the one or more processors cause the one or more processors to:
      receive, from the passenger, a request for an expedited delivery of the property item, and
      determine, in response to a receipt of information that indicates a detection of the property item left behind in a vehicle, a first waypoint based on a location of the property item and a second waypoint based on a pickup location for the passenger, wherein a determination of the first waypoint uses:
         in response to a receipt of the request for the expedited delivery, a first radial threshold to define an area from which to identify a potential participant for a return of the property item,
         in response to an absence of the receipt of the request for the expedited delivery, a second radial threshold to define the area from which to identify the potential participant for the return of the property item,
         a measure of the first radial threshold being greater than a measure of the second radial threshold, the second radial threshold being used for a determination of the first waypoint in the absence of the receipt of the request for the expedited delivery;
   a routing module including instructions that when executed by the one or more processors cause the one or more processors to construct, in response to the receipt of the request for the expedited delivery, an expedited delivery route between the first waypoint and the second waypoint, wherein the expedited delivery route includes a trip, selected from the records of trips, in which the sum associated with the trip is less than a sum associated with any other trip from the record of trips, the sum being a distance between a trip beginning location and the first waypoint added to a distance between a trip ending location and the second waypoint, wherein the expedited delivery route is constructed having a first segment and a second segment, the first segment corresponding to a portion of a first trip to be carried out by an autonomous vehicle in the transportation environment, the second segment corresponding to a portion of a second trip to be carried out by another vehicle in the transportation environment, an intersection of the first segment and the second segment being a handoff point, the expedited delivery route including an adjustment of a timing of the first trip so that the autonomous vehicle and the other vehicle are at the handoff point within a window of time, the adjustment of the timing being such that a deviation of an overall timing of the first trip is within a threshold amount of time, a distance of the expedited delivery route being less than a distance of a delivery route constructed in the absence of the receipt of the request for the expedited delivery; and
   a route confirmation module including instructions that when executed by the one or more processors cause the one or more processors to:
      transmit a request for confirmation to at least one participant of at least one of the first trip or the second trip, the request including information about the adjustment of the timing, and obtain confirmation of acceptance of the expedited delivery route and the adjustment of the timing from the at least one participant of the at least one of the first trip or the second trip; and a communication system configured to communicate, to the autonomous vehicle, an instruction to be executed by an autonomous driving module of the autonomous vehicle to control at least one vehicle system of the autonomous vehicle to execute the first trip with the adjustment of the timing.

2. The property delivery system of claim 1, wherein the route confirmation module further includes instructions to obtain confirmation of a handoff of the property item between a first participant traveling in the first trip and a second participant traveling in the second trip.

3. The property delivery system of claim 2, wherein the route confirmation module further includes instructions to transmit an update notification to the passenger upon completion of the handoff.

4. The property delivery system of claim 1, wherein the waypoint module further includes instructions to determine the second waypoint by sending a notification to the passenger to request a designation for the second waypoint.

5. The property delivery system of claim 4, wherein the notification further provides the passenger an option to select the expedited delivery, and wherein the routing module further includes instructions to transmit a request to participants of the trips to be carried out in the transportation environment, the request including information that provides an incentive to complete a single trip from the first waypoint to the second waypoint when the passenger selects the expedited delivery.

6. The property delivery system of claim 1, wherein the transportation environment is one or more of a rideshare network, a taxi network, or a bus network.

7. The property delivery system of claim 1, wherein the at least one participant is a different passenger in the transportation environment.

8. The property delivery system of claim 1, wherein the route confirmation module further includes instructions to obtain confirmation of delivery of the property item by the at least one participant and/or the passenger in accordance with the delivery route.

9. The property delivery system of claim 1, wherein the communication system is configured to communicate wirelessly with the autonomous vehicle and to transmit instructions to the autonomous vehicle to execute within the expedited delivery route, wherein the at least one participant is pre-registered under an agreement to confirm acceptance of delivery routes that do not require the at least one participant to deviate from a scheduled trip by greater than the threshold amount of time.

10. A method of delivering a property item left in a transportation environment to a passenger of the transportation environment, comprising:
receiving, from the passenger, a request for an expedited delivery of the property item;
determining, in response to a receipt of information that indicates a detection of the property item left behind in a vehicle, a first waypoint based on a location of the property item, wherein a determination of the first waypoint uses:
in response to a receipt of the request for the expedited delivery, a first radial threshold to define an area from which to identify a potential participant for a return of the property item,
in response to an absence of the receipt of the request for the expedited delivery, a second radial threshold to define the area from which to identify the potential participant for the return of the property item,
a measure of the first radial threshold being greater than a measure of the second radial threshold, the second radial threshold being used for a determination of the first waypoint in the absence of the receipt of the request for the expedited delivery;
determining a second waypoint based on a pickup location identified by the passenger;
constructing, in response to the receipt of the request for the expedited delivery, an expedited delivery route between the first waypoint and the second waypoint, wherein the expedited delivery route includes a trip, selected from the records of trips, in which a sum associated with the trip is less than the sum associated with any other trip from the record of trips, the sum being a distance between a trip beginning location and the first waypoint added to a distance between a trip ending location and the second waypoint, the expedited delivery route having a first segment and a second segment, the first segment corresponding to a portion of a first trip to be carried out by an autonomous vehicle in the transportation environment, the second segment corresponding to a portion of a second trip to be carried out by another vehicle in the transportation environment, an intersection of the first segment and the second segment being a handoff point, the expedited delivery route including an adjustment of a timing of the first trip so that the autonomous vehicle and the other vehicle are at the handoff point within a window of time, the adjustment of the timing being such that a deviation of an overall timing of the first trip is within a threshold amount of time, a distance of the expedited delivery route being less than a distance of a delivery route constructed in the absence of the receipt of the request for the expedited delivery;
transmitting a request for confirmation to at least one participant of at least one of the first trip or the second trip, the request including information about the adjustment of the timing;
obtaining confirmation of acceptance of the expedited delivery route and the adjustment of the timing from the at least one participant of the at least one of the first trip or the second trip;
communicating, to the autonomous vehicle, an instruction to be executed by an autonomous driving module of the autonomous vehicle to control at least one vehicle system of the autonomous vehicle to execute the first trip with the adjustment of the timing; and
obtaining confirmation of delivery of the property item by the at least one participant and/or the passenger in accordance with the expedited delivery route.

11. A system, comprising:
a processor;
a database configured to store records of trips;
a memory storing a module configured to cause the processor to:
receive a request for an expedited delivery of a property item,
determine a first waypoint based on a location of the property item and a second waypoint based on a pickup location, wherein a determination of the first waypoint uses:

in response to a receipt of the request, a first radial threshold to define an area from which to identify a potential participant for a return of the property item, and in response to an absence of the receipt of the request, a second radial threshold to define the area from which to identify the potential participant for the return of the property item, the first radial threshold being greater than the second radial threshold, the second radial threshold being used for a determination of the first waypoint in the absence of the receipt of the request, and construct, in response to the receipt of the request, a route, between the first waypoint and the second waypoint, wherein the route includes a trip, selected from the records of trips, in which a sum associated with the trip is less than the sum associated with any other trip from the record of trips, the sum being a distance between a trip beginning location and the first waypoint added to a distance between a trip ending location and the second waypoint, the route having at least one segment, a segment, of the at least one segment, to be traversed by an autonomous vehicle, a distance of the route being less than a distance of a route constructed in the absence of the receipt of the request; and a communication system configured to communicate, to the autonomous vehicle, an instruction to cause the autonomous vehicle to move along the segment.

* * * * *